United States Patent [19]
Ebeling

[11] 3,798,052
[45] Mar. 19, 1974

[54] POLYVINYLIDENE FLUORIDE COATING FOR METALS

[75] Inventor: Joachim Ebeling, Tacherting, Germany

[73] Assignee: Suddeutsche Kalkstickstoff-Werke AG, Trostberg, Germany

[22] Filed: June 28, 1972

[21] Appl. No.: 267,014

[30] Foreign Application Priority Data
June 30, 1971 Germany............................ 2132645

[52] U.S. Cl.................. 117/75, 117/97, 117/132 CF
[51] Int. Cl.............................................. B32b 15/08
[58] Field of Search.......................... 117/132 CF, 75

[56] References Cited
UNITED STATES PATENTS

| | | | |
|---|---|---|---|
| 2,777,783 | 1/1957 | Welch | 117/132 CF X |
| 3,240,744 | 3/1966 | Kusiak | 117/132 CF |
| 3,607,827 | 9/1971 | Dukert et al. | 117/132 CF X |
| 3,390,118 | 6/1968 | Bach et al. | 117/75 X |
| 3,708,463 | 1/1973 | Stallings | 117/132 CF X |

Primary Examiner—Ralph Husack

[57] ABSTRACT

A firmly adhering coating on a metal includes a baked base layer whose binder component is a linear polyester resin and a hardener for the same, and a baked surface layer essentially consisting of 10 to 40 percent of the polyester resin employed in the base layer and 60 to 90 percent polyvinylidene fluoride.

6 Claims, No Drawings

POLYVINYLIDENE FLUORIDE COATING FOR METALS

This invention relates to protective and decorative organic coatings for metals, and particularly to polyvinylidene fluoride coatings.

Coatings of pure polyvinylidene fluoride have been applied to metals heretofore, but they showed only poor adhesion to the substrate. It has been attempted to improve adhesion by interposing a primer between the metal and the polyvinylidene fluoride layer, such as an epoxy resin primer containing polyvinylidene fluoride or corresponding primers partly based on special acrylic resins or aldehyde-modified acrylamide polymers. The epoxy resin primers have a very short pot life when mixed with the necessary catalyst while the acrylic primers are so inferior to polyvinylidene fluoride in their mechanical, thermal, and chemical properties as to reduce the overall quality of the laminar coating.

The primary object of the invention is the provision of a polyvinylidene fluoride coating for metals which is free of the shortcomings of the afore-described, known laminar coatings and provides the unimpaired advantages of polyvinylidene fluoride as a coating material.

The coatings of the invention include a baked base layer whose binder components are a saturated, linear polyester and a hardener therefore, and a surface layer whose binder component essentially consists of 10 to 40 percent of the aforementioned polyester and 60 to 90 percent polyvinylidene fluoride. All the foregoing percentage values referred to in this application and the appended claims are by weight unless otherwise specifically stated.

The two layers are applied sequentially to the degreased or otherwise prepared metallic substrate by spraying, brushing, rolling of their solutions, or dispersions in a conventional manner, and are cured by baking at an elevated temperature at which the solvents present evaporate. The dispersing media employed are individual solvents or solvent mixtures in which the polyester employed is dissolved and which have desirable evaporation rates for forming an intimate mixture of the polyester and the polyvinylidene fluoride in the surface layer.

Suitable solvents include ketones (methylethylketone), esters (dimethyl phthalate, methyl acetate, ethyl acetate, ethyl acetoacetate, methylglycol acetate, ethylglycol acetate), halogenated hydrocarbons (methylene chloride), aromatic hydrocarbons (benzene, toluene), cyclic ketones (cyclohexanone, isophoron), and amides of carboxylic acids (dimethylformamide), the compounds listed in parentheses being merely representative of the various mentioned classes of solvents. Dimethyl phthalate and/or methylglycol acetate have been found most advantageous, and may be further combined with low-boiling organic solvents, such as chloroform, benzene, methylene chloride, and the like, which facilitate the establishment of desired processing conditions. Hydrocarbons, also their halides, are employed in combination with polar solvents.

The conventional types of polyesters may be employed, those having aromatic acid moieties and aliphatic alcohol moieties being preferred. The sole qualifications required of the polyester used for this invention are good solubility, and the ability of being cured at elevated temperature to form a layer of lacquer.

The best polyester found so far is a neutral, saturated, linear polyester obtained from an aromatic dicarboxylic acid and an aliphatic diol, having an average molecular weight of 18,000 to 20,000, a melting range of 90° to 150°C, a hydroxyl number of 5 to 10 (as determined by the method of Norman and Schildknecht: Fettchem. Rundschau 40, 194), and an acid number of 0 – 3, as determined by German Industrial Standard DIN 53 183. Polyester having the desired characteristics are staple articles of commerce (Dynapol L 206, manufactured by Dynamit Nobel, for example). The average molecular weight may range from 15,000 to 25,000, and the melting range from 70° to 200°C without major loss in coating properties.

The polyester is hardened by addition of conventional hardeners, such as melamine or guanamine resins, urea resins, and polyurethanes.

The base layer is preferably applied at a rate to produce a dry, cured film 2 to 20 $\mu$m thick, best results being usually obtained with films having a thickness of 5 to 12 $\mu$m. The permissible lower limit of base layer thickness is a function of the desired adhesion of the surface layer to the substrate, and should be determined experimentally if a very thin base layer, such as one thinner than 2 $\mu$m, should be preferred. An upper limit of thickness cannot be established by technical criteria, but is a matter of convenience and economy. No further improvement in the adhesion of a surface layer can be achieved by making the base layer thicker than 20 $\mu$m. However, heavier base layers may be resorted to for leveling the surface of a rough substrate.

The polyvinylidene fluoride-bearing surface layer may be applied at any time after the curing or baking of the base layer. The polyvinylidene fluoride is dispersed in the liquid medium in the form of finely ground particles having a primary particle size of 1 $\mu$m or less. The preparation of a suitable grade of polyvinylidene fluoride has been described, for example, in the published German Pat. application No. 1,939,852. Vinylidene fluoride is polymerized at elevated temperature and pressure in an acidic aqueous medium in the presence of a peroxydisulfate catalyst and at an initiator concentration of less than 0.5 g/l liquid mixture.

The surface layer, when dry, should have a thickness of 5 to 50 $\mu$m, preferably 20 to 30 $\mu$m, but surface layers that are thinner or thicker may be found useful under special conditions. When the lower thickness limit is not reached, the desirable properties of polyvinylidene fluoride may not be fully available.

The polyester component of the surface coating should satisfy the same requirements as those pointed out above with reference to the base layer. Different polyesters may be employed in the two superposed layers, but the polyester used in the surface layer, if different from that in the base layer, should satisfy the molecular weight and melting range requirements set forth above.

The laminar coating, in addition to its essential ingredients described above, may also contain thermally stable pigments, preferably oxides of the transition metals, and particularly titanium dioxide. The pigments may be employed jointly with a wetting agent for better wetting of the pigment by the binder. Amphoteric wetting agents have been found most suitable.

The coating compositions may further include additives conventional in organic coatings such as adhesion-improving, gloss-enhancing, and delustering agents.

The two lacquer compositions respectively employed in forming the base and surface layers of the coating, are sequentially applied in a wet thickness sufficient to yield the desired dry film thickness, and individually cured or baked under conditions suitable for the specific compositions. With the preferred compositions described above, the curing time may be 0.5 to 2 minutes at 250° – 300°C oven temperature.

The metal surfaces to be coated are prepared for coating in a known manner. They are at least degreased. When the substrate is steel, it may be coated with zinc or receive chromate and/or phosphate conversion coatings. Aluminum is preferably given a chromate conversion coating such as alodizing.

The laminar, organic coatings of the invention combine the known, superior properties of polyvinylidene fluoride and of polyester in a most satisfactory manner so that the coatings have excellent adhesion and have sufficient resiliency to permit severe deformation of the substrate without peeling or other separation. The coatings are chemically inert, weather resistant, and do not yellow when exposed to light. They are eminently suitable for protecting articles exposed to the atmosphere. However, they have also been used successfully for lining pipes, storage containers, chemical reactors, and electroplating racks.

The invention will further be illustrated by the following Examples, and it will be understood that the invention is not limited thereto.

EXAMPLE 1

Base layer compositions Nos. 1 to 7 were prepared by dissolving the polyester described above (Dynapol L 206), with or without an amphoteric wetting agent (Troy-98-C), in solvent at 70°C. As far as a pigment ($TiO_2$ of rutile type) and a hardener was employed, the mixture was homogenized on a ball mill for 15 hours at ambient temperature (about 20°C). The several compositions then were applied to metallic substrates as wet films 50 $\mu$m thick, and baked or cured at 250°C for 2 minutes.

Table I lists the percentage of polyester, pigment, hardener, and solvent in each composition, and the thickness of the dry base layer obtained after baking. The hardeners employed were melamine butyl ether, benzoquanamine formaldehyde resin (BFR), and toluenesulfonic acid. The solvents were dimethyl phthalate, methylethylketone, and methylglycol acetate, and names are partly abbreviated in the Table.

In preparing the surface layer compositions, the same polyester and wetting agent as described in Example 1 were dissolved at 70°C in organic solvent, and the hardener and pigment, if used, and the polyvinylidene fluoride were dispersed in the polyester solution by grinding in a ball mill for 15 hours at ambient temperature as in Example 1. In preparing the surface layer compositions Nos. 19 – 21 listed in Table II below, the pigment was ground with the polyester solution for about 5 to 6 hours before the polyvinylidene fluoride was added and grinding continued for 15 hours longer.

Table II identifies the substrate employed with each surface coating No. 8 to 22 by a lower case letter. Thus, a indicates an aluminum alloy sheet, 1.5 mm thick, containing 1% Mg, degreased in an aqueous commercial cleaning solution at 70°C for 30 seconds, etched, and alodized at 50°C for 10 seconds. A zinc coated steel sheet, 0.75 mm thick, is indicated by b, whereas c refers to a steel sheet of equal thickness carrying a phosphate conversion coating.

An asterisk after a sample number indicates a control not according to the invention in at least one respect. The polyvinylidene fluoride employed was prepared according to German published Pat. application No. 1,939,852 except in Nos. 11 and 13 where an asterisk follows the percentage figure for the polyvinylidene fluoride. Table II also identifies the base layer employed, if any, by the number assigned in Table I. All surface layer compositions were applied in a wet film thickness of 150 $\mu$m and baked at 250°C for 2 minutes, except No. 8+ which was 200 $\mu$m thick and was baked at 300°C and No. 22 which was baked for 3 minutes. All coatings were tested for pendulum hardness according to Konig by the method of German Industrial Standard DIN 53 157 (seconds), and for adhesion by the method of DIN 53 151 in which 0 is the highest rating. Qualitative tests were also performed for adhesion after bending of the substrate and for surface texture which was smooth in all samples but No. 10+ which showed severe surface cracks.

TABLE I

| Base coating No. | 1 | 2 | 3 | 4 | 5 | 6 | 7 |
|---|---|---|---|---|---|---|---|
| Polyester, % | 19.8 | 9.8 | 17.2 | 17.4 | 17.5 | 17.5 | 17.8 |
| $TiO_2$, % | 4.0 | 2.0 | 3.4 | 3.5 | 3.5 | 3.5 | — |
| Melamine-Bu-ether,% | — | 15.0 | 12.9 | 13.02 | — | — | — |
| BFR % | — | — | — | — | 5.5 | 5.27 | 7.30 |
| Toluenesulfonic ac., % | — | — | — | — | 0.5 | 0.03 | 0.10 |
| Amph. wetting agent, % | — | — | 0.1 | 0.08 | 0.1 | 0.1 | 0.1 |
| Dimethyl phthalate, % | 7.6 | 66.0 | 6.8 | 6.6 | 12.2 | 12.2 | 12.5 |
| MEK, % | — | 7.2 | — | — | — | — | — |
| Methylglycol acet., % | 68.6 | — | 59.6 | 59.4 | 61.2 | 61.2 | 62.2 |
| Dry film thickness, $\mu$m | 7 | 6 | 5 | 7 | 8 | 7 | 6 |

TABLE II

| Surface coating No. | 8+ | 9+ | 10+ | 11+ | 12 | 13+ | 14 | 15 | 16 | 17 | 18 | 19 | 20 | 21 | 22 |
|---|---|---|---|---|---|---|---|---|---|---|---|---|---|---|---|
| Substrate | a | a | b | b | b | b | b | b | b | b | c | a | b | c | b |
| Base layer No. | — | — | 1 | — | 2 | 2 | 2 | 4 | 4 | 4 | 5 | 6 | 6 | 6 | 7 |
| Polyvin. fluoride, % | 20.8 | 15.2 | 21.3 | 20.8+ | 14.9 | 14.9+ | 21.3 | 20.81 | 17.7 | 12.8 | 12.8 | 12.8 | 12.8 | 12.8 | 14.8 |

TABLE II—Continued

| Surface coating No. | 8+ | 9+ | 10+ | 11+ | 12 | 13+ | 14 | 15 | 16 | 17 | 18 | 19 | 20 | 21 | 22 |
|---|---|---|---|---|---|---|---|---|---|---|---|---|---|---|---|
| Polyester, % | — | 2.3 | 6.4 | 6.3 | 4.6 | 4.6 | 6.4 | 6.3 | 5.3 | 3.8 | 3.8 | 3.8 | 3.8 | 3.8 | 4.0 |
| Pigment, % | 8.3 | 6.1 | 8.5 | 10.4 | 6.0 | 6.0 | 8.5 | 10.4 | 8.9 | 6.4 | 6.4 | 6.4 | 6.4 | 6.4 | — |
| Wetting agent, % | — | — | — | 0.1 | — | — | — | 0.09 | 0.08 | 0.1 | 0.1 | 0.1 | 0.1 | 0.1 | 0.2 |
| Dimethyl phthal., % | — | 76.4 | 6.4 | 6.2 | 67.1 | 67.1 | 6.4 | 5.99 | 5.3 | 76.9 | 76.9 | 76.9 | 76.9 | 76.9 | 81.0 |
| Methylglycol ac., % | — | — | 57.4 | 56.2 | — | — | 57.4 | 56.2 | 47.72 | — | — | — | — | — | — |
| MEK, % | — | — | — | — | 7.5 | 7.5 | — | — | — | — | — | — | — | — | — |
| Isophoron, % | 70.9 | — | — | — | — | — | — | — | — | — | — | — | — | — | — |
| Dry film thickness, μm | 24 | 20 | 30 | 30 | 27 | 23 | 38 | 24 | 41 | 27 | 28 | 24 | 28 | 21 | 20 |
| Hardness, DIN 53 157 | 155 | 129 | 137 | 134 | 141 | 133 | 144 | 140 | 105 | 132 | 136 | 150 | 134 | 148 | 140 |
| Adhesion, DIN 53 151 | 4 | 4 | 0 | 4 | 0 | 4 | 0 | 0 | 0 | 0 | 0 | 0 | 0 | 0 | 0 |
| Adhesion after bending | bad | bad | v.g. | bad | v.g. | bad | v.g. | v.g. | v.g. | v.g. | v.g. | v.g. | v.g. | v.g. | v.g. |

What is claimed is:

1. An adherent, organic, laminar coating on a metallic substrate comprising:
   a. a baked base layer essentially consisting of a saturated, linear polyester resin and a hardener for said resin; and
   b. a baked surface layer directly superimposed on said base layer and essentially consisting of 10 to 40 percent of said polyester resin and 60 to 90 percent polyvinylidene fluoride uniformly dispersed in said polyester resin.

2. A coating as set forth in claim 1 wherein said polyester resin consists of an aromatic dicarboxylic acid moiety and an aliphatic diol moiety.

3. A coating as set forth in claim 2, wherein said polyester resin has an average molecular weight of 15,000 to 25,000, a melting range of 70° to 200°C, a hydroxyl number of 5 to 10, and an acid number of 0 to 3.

4. A coating as set forth in claim 3, wherein said hardener is an amount of melamine resin or guanamine resin sufficient for enhancing the hardness of said base layer.

5. A coating as set forth in claim 4, wherein the thickness of said base layer is 2 to 20 μm, and the thickness of said surface layer is 5 to 50 μm.

6. A coating as set forth in claim 4, further containing titanium dioxide and an amphoteric wetting agent.

* * * * *